United States Patent [19]
Datta et al.

[11] Patent Number: 5,844,049
[45] Date of Patent: Dec. 1, 1998

[54] SULFUR-VULCANIZED RUBBER COMPOSITIONS COMPRISING SUBSTITUTED SUCCINIMIDE COMPOUNDS

[75] Inventors: Rabindra Nath Datta, Deventer; Auke Gerardus Talma, Bathmen; Arie Jacob de Hoog, Ugchelen; Andre Steenbergen, Arnhem; Berend Jan Dijk, Leusden, all of Netherlands

[73] Assignee: Akzo Nobel nv, Arnhem, Netherlands

[21] Appl. No.: 849,519

[22] PCT Filed: Dec. 22, 1995

[86] PCT No.: PCT/EP95/05177

§ 371 Date: Jun. 12, 1997

§ 102(e) Date: Jun. 12, 1997

[87] PCT Pub. No.: WO96/20246

PCT Pub. Date: Jul. 4, 1996

[30] Foreign Application Priority Data

Dec. 28, 1994  [EP]  European Pat. Off. .............. 94203783

[51] Int. Cl.[6] ....................................................... C08F 8/34
[52] U.S. Cl. ..................................... 525/332.6; 525/332.4; 525/332.7; 525/375
[58] Field of Search .............................. 525/332.6, 332.7, 525/375

[56] References Cited

U.S. PATENT DOCUMENTS

| | | | |
|---|---|---|---|
| 3,297,713 | 1/1967 | Ladd | 260/326.3 |
| 4,482,741 | 11/1984 | Kurek | 564/415 |

FOREIGN PATENT DOCUMENTS

| | | | |
|---|---|---|---|
| 0 191 931 | 8/1986 | European Pat. Off. | C08K 5/51 |
| 0 345 825 | 12/1989 | European Pat. Off. | C08K 5/34 |
| 0 410 152 | 1/1991 | European Pat. Off. | C08L 21/00 |
| 9207904 | 5/1992 | WIPO . | |
| WO 92/07904 | 5/1992 | WIPO | C08K 5/3415 |

OTHER PUBLICATIONS

"Rubber microstructure and reversion", Nordsiek, Dr. K.H., *Rubber World* 197(3), pp. 30–38, 1987.

"Physikalische und chemische Aspekte der Reversion", *Kautschuk + Gummi–Kunstoffe*, 34, No. 9, 1981.

"Vulcanization with Maleimides", *Journal of Applied Polymer Science*, vol. 8, pp. 2281–2298 (1964).

"Vulcanisation of cis–1, 4–isoprene rubber by derivatives of maleimide under the action of high temperatures and radiation", *Kauchuk i Rezina*, No. 3, pp. 10–12, 1974.

"High–temperature vulcanisation of unsaturated rubbers by thio derivatives of malimide", *Kauchuk i Rezina*, No. 3, pp. 16–19, 1975.

"Influence of the type and concentration of crosslinking agent on the effectiveness of a combined system of bismaleimide and sulphur", *Kauchuk i Rezina*, No. 10, pp. 15–19, 1985.

Hofmann, *Rubber Technololgy Handbook*, chapter 4, Rubber Chemicals and Additives, pp. 217–353, Hanser Publishers, Munich 1989.

J6 1014–238–A (abstract), 1984.

J6 3321–333–A (abstract), 1987.

J6 3286–445–A (abstract), 1987.

*Chemistry of Synthetic High Polymers*, No. 16, 1987, Chemical Abstract 107: 134698v (1986).

"Change in the Structure and Properties of Vulcanizates Based on Natural Rubber Under Prolonged Vulcanization in the Presence of Vulcanizing Systems Containing Sulfur and Bismaleimides", Chavchich, T.A., et al., *Kauchuk i Rezina*, vol. 4, pp. 20–23, 1981.

"Advanced Organic Chemistry" by J. March, 4th ed., John Wiley & Sons (pp. 205, 1005 and 1008).

*Primary Examiner*—Edward J. Cain
*Attorney, Agent, or Firm*—Ralph J. Mancini; Dilworth & Barrese

[57] ABSTRACT

Rubber compositions are provided having improved physical properties. More particularly, the present invention relates to sulfur-vulcanized rubber compositions which are vulcanized in the presence of certain bis-succinimide coagents, which possess anti-reversion and/or accelerating properties. The invention also relates to a sulfur-vulcanization process which is carried out in the presence of one or more bis-succinimide coagents, and to the use of bis-succinimide coagents in the sulfur-vulcanization of rubber. Finally, the invention relates to rubber products comprising rubber vulcanized with sulfur in the presence of one or more bis-succinimide coagents.

10 Claims, No Drawings

SULFUR-VULCANIZED RUBBER COMPOSITIONS COMPRISING SUBSTITUTED SUCCINIMIDE COMPOUNDS

FIELD OF THE INVENTION

This invention relates to rubber compositions having improved physical properties. more particularly, it relates to sulfur-vulcanized rubber compositions which are vulcanized in the presence of particular coagents with anti-reversion and/or accelerating activity. The invention also relates to a sulfur-vulcanization process which is carried out in the presence of particular coagents with anti-reversion and/or accelerating activity and the use of such coagents in the sulfur-vulcanization of rubber. Finally, the invention relates to rubber products comprising rubber vulcanized with sulfur in the presence of such coagents.

BACKGROUND OF THE ART

In the tire and belt industries, among others, better mechanical and heat resistance properties are being demanded. It has long been known that the mechanical properties of rubber can be improved by using a large amount of sulfur as a cross-linking agent to increase the cross-link density in vulcanized rubbers. However, the use of large amounts of sulfur suffers from the disadvantage that it produces reversion and leads to a marked decrease in heat resistance and resistance to flex cracking, among other properties, in the final product. The fact that reversion is a continuing problem can be seen from, "Rubber Microstructure and Reversion", Nordsiek, Dr. K. H., *Rubber World*, 197 (3), pp. 30–38, 1987, and "Physikalische and Chemische Aspekte der Reversion", *Kautschuk+Gummi-Kunstoffe*, 34, No. 9, 1981.

In order to eliminate the foregoing disadvantage, it has been proposed to add coagents to sulfur-vulcanization systems. One known type of coagent are the maleimides. Such vulcanization systems are disclosed in, "Vulcanization With Maleimides", *Journal of Applied Polymer Science*, Vol. 8, pp. 2281–2298 (1964).

U.S. Pat. No. 3,297,713 suggests the use of dithio-bis(N-phenylmaleirnides) as vulcanizing agents for rubber. However, this system does not employ sulfur as a vulcanization agent and thus suffers from several disadvantages which result from the absence of sulfur cross-links in the rubber product.

Japanese patent publication JP b1014-238 discloses sulfur-vutcanization systems wherein maleimides are used as coagents and which also contain either dibenzothiazyl disulfide or tetrarnethylthiuram disulfide. However, this solution is of limited application since only vulcanization accelerators having relatively short scorch times can be used with the bis-maleimides.

European patent application (EP-A-) 0191931 suggests that the use of a bismaleimide compound in combination with a sulfenamide and a dithiophosphoric acid leads to further improvements in the mechanical and anti-reversion properties of sulfur-vulcanized rubbers. The patent specification claims that these rubbers exhibit improved resistance to reversion, resistance to heat aging and resistance to flex cracking. However, this system is limited to vulcanization carried out in the presence of a sulfenamide accelerator in combination with a dithiophosphoric acid accelerator and is thus of limited utility in actual practice.

In the article, "Change in the Structure and Properties of Vulcanizates Based on Natural Rubber Under Prolonged Vulcanization in the Presence of Vulcanizing Systems Containing Sulfur and Bismaleimides", Chaychich, T. A., et al., *Kauchuk i Rezina*, vol. 4, pp. 20–3, 1981, there is disclosed that vulcanization of natural rubber tread stocks with sulfur in the presence of m-phenylene-bismaleinide at 143 ° C. over a 600-minute period gave vulcanizates with enhanced physiomechanical properties and resistance to reversion Other articles relating to the sulfur-vulcanization of rubbers using bismaleimides as coagents include, "Vulcanization of cis-1,4-isoprene rubber by derivatives of maleimide under the action of high temperatures and radiation," *Kauchuk i Rezina*, vol 3, pp. 10–12, 1974; "High-temperature Vulcanization of Unsaturated Rubbers by Thio Derivatives of Maleimide", *Kauchuk i Rezina*, vol. 3, pp. 16–19, 1975; and, "Influence of the Type and Concentration of Crosslinking Agent on the Effectiveness of a Combined System of Bismaleimide and Sulfur", *Kauchuk i Rezina*, No. 10, pp. 15–19, 1985.

Even more recently, Japanese patent applications JPb3286-445 and JPb3312-333 disclosed the vulcanization of rubber with sulfur and an aliphatic bismaleirnide or N,N'-toluene-bismaleimide. These particular bismaleimides are said to improve the heat resistance and adhesion properties of the rubbers.

Further, EP-A-0345825 and 0410152 also relate to the use of bismaleimides as coagents in sulfur-vulcanization of rubber. These two disclosures are directed to vulcanization systems which contain a second coagent, presumably to improve upon the bis-maleimide system.

Despite the fact-that some of the above patents claim to reduce reversion by addition of a bismaleimide, in actual practice the reduction in reversion achieved with the bismaleittudes is insufficient. Accordingly, although the reversion and the heat resistance are slightly improved, the problem remains that there is no generally applicable anti-reversion agent which may be used in combination with a number of different rubber accelerators during the vulcanization process and which satisfactorily solves the reversion problem while at the same time significantly improving the heat resistance of sulfur-vulcanized rubbers without having an adverse affect on other rubber properties.

SUMMARY OF THE INVENTION

The present invention provides a solution to the above problems by the use of a novel class of coagents with anti-reversion and/or accelerating activity in the sulfur-vulcanization of rubbers. More particularly, in a first aspect, the present invention relates to a sulfur-vulcanized rubber composition which comprises the vulcanization reaction product of:

(A) 100 parts by weight of at least one natural or synthetic rubber;

(B) 0.1 to 25 parts by weight of sulfur and/or a sufficient amount of a sulfur donor to provide the equivalent of 0.1 to 25 parts by weight of sulfur; and (C) 0.1 to 10 parts by weight of a coagent of the following formula I:

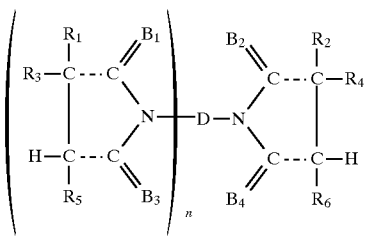

(I)

wherein $R_1$ and $R_2$ represent each independently a suitable leaving group; $R_3$ and $R_4$ are independently selected from hydrogen, OH, $CH_2OH$, $CH_2Cl$, $CH_2Br$, $CH_2NH_2$, $CH_2CN$, $CH_2R$, $CH_2OR$, $SO_2R$, $CHCl_2$, $CCl_3$, $CHBr_2$, $CBr_3$, $CH_2F$ and $CF_3$, wherein R is hydrogen, $C_{1-10}$ alkyl, $C_{6-18}$ aryl, $C_{7-20}$ alkaryl or $C_{7-20}$ aralkyl, the aryl groups being optionally substituted; $R_5$ and $R_6$ are independently selected from the same substituents as for $R_3$ and may also be hydrogen or halogen; $B_1$, $B_2$, $B_3$ and $B_4$ are independently selected from oxygen and sulfur; n is an integer from 1 to 10; and D is a polyvalent radical. Preferably, n is 1, 2 or 3.

In another aspect, the present invention relates to a vulcanization process carried out in the presence of a coagent of the formula I as defined above. In a further aspect, the invention relates to the use of such a coagent in the sulfur-vulcanization of rubbers. The invention also encompasses rubber products which comprise at least some rubber which has been vulcanized with sulfur in the presence of a coagent of the formula I as defined above.

DETAILED DESCRIPTION

The present invention provides an excellent anti-reversion effect as well as improvements in several rubber properties without having a significant adverse effect on the remaining properties of the rubber, when compared with similar sulfur-vulcanization systems using other coagents.

The present invention is applicable to all natural and synthetic rubbers. Examples of such rubbers include, but are not limited to, natural rubber, styrene-butadiene rubber, butadiene rubber, isoprene rubber, acrylonitrile-butadiene rubber, chloroprene rubber, sopreneisobutylene rubber, brominated isoprene-isobutylene rubber, chlorinated isoprene-sobutylene rubber, ethylene-propylene-diene terpolymers, as well as combinations of two or more of these rubbers and combinations of one or more of these rubbers with other rubbers and/or thermoplastics.

Examples of sulfur which may be used in the present invention include various types of sulfur such as powdered sulfur, precipitated sulfur and insoluble sulfur. Also, sulfur donors may be used in place of, or in addition to sulfur in order to provide the required level of sulfur during the vulcanization process. Examples of such sulfur donors include, but are not limited to, tetramethylthiuram disulfide, tetraethylthiuram disulfide, tetrabutylthiuram disulfide, dipentamethylene thiuram hexasulfide, dipentamethylene thiuram tetrasulfide, dithiodimorpholine, caprolactamdisulfide, and mixtures thereof.

In this text, references to sulfur shall include sulfur donors and mixtures of sulfur and sulfur donors. Further, references to the quantity of sulfur employed in the vulcanization, when applied to sulfur donors refer to the quantity of sulfur donor which is required to provide the equivalent amount of sulfur that is specified. The anti-reversion coagents of the present invention are characterized by the fact that they must be capable of forming cross-links bonded to the rubber by a carbon-carbon linkage. This type of crosslink is known in the rubber literature from, for example, "High-temperature vulcanization of unsaturated rubbers by thio derivatives of maleimide", Krashennikov et al., *Kauchuk i Rezina*, No. 3, pp. 16–20, 1975. Such cross-links bonded to the rubber by a carbon-carbon linkage are highly desirable in rubbers, and particularly sulfur-vulcanized rubbers since such cross-links are thermally stable.

Accordingly, we have found that it is desirable, in sulfur vulcanization, to produce cross-links bonded to the rubber by carbon-carbon linkages. For the purposes of this patent application, these cross-links will be hereinafter referred to as, "carbon-carbon" cross-links. In order to make a thermally stable rubber composition which still possesses the advantageous properties of sulfur-vulcanization, however, it remains necessary to combine the formation of carbon-carbon linkages with the formation of the stable monosulfidic cross-links which result from sulfur-vulcanization.

While it is possible to obtain a significant number of carbon-carbon cross-links by sulfur-vulcanizing rubber in the presence of bismaleimides, we have found that such rubbers still suffer from significant reversion (reduction in the cross-link density) upon thermal loading of the rubber after vulcanization. This leads to a corresponding worsening of some of the imnportant properties of such rubber compositions during their use in, for example, tires.

Succinimido coagents of the present invention include compounds represented by the general formula I which is defined above.

Suitable leaving groups for the purpose of the present invention are groups or atoms which become cleaved from the substrate molecule of formula I at appropriate reaction rate and include, for example, Cl, Br, $S_p$, $OSO_2R$, $S_pR$, OR, OOR, OCOR, OSOR (R being, for example, hydrogen, $C_{1-10}$ alkyl, $C^{6-8}$ aryl, $C_{7-20}$ alkaryl and $C_{7-20}$ aralkyl, the aryl group being optionally substituted), $S_pC(S)OR_7$, $NR_7R_8$, $N^+R_7R_8R_9$, $S_pNR_7R_8$, $S_pC(S)NR_7R_8$, $R_7$ substituted 2-mercaptothiazolyl having one or more sulfur bridging atoms, $(RO)_2$—P(O)—$S_p$, $(RS)_2$—P(O)—$S_p$, $(RO)_2$—P(S)—$S_p$, $(RS)_2$—P(S)—$S_p$, phthalimido-$S_p$, $R_7$ substituted cyclohexenyl, and

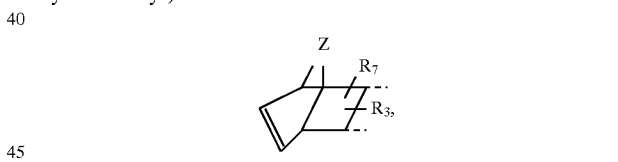

wherein $R_1$ and $R_8$ are independently selected from hydrogen, $C_{1-10}$ alky, $C_{6-18}$ aryl, $C_{7-20}$ alkaryl and $C_{7-20}$ aralkyl, the aryl group being optionally substituted, $R_9$ has the same meaning as $R_7$ except hydrogen, Z is O or $CH_2$, and p is an integer of 1 to 4. If $R_3$ and $R_4$ are each independently selected from $CH_2F$, $CH_2Cl$, $CH_2Br$, $CH_2I$, $CHF_2$, $CHCl_2$, $CHClBr$, $CHBr_2$, $CHI_2$ or $CH_2R'$ (where R' is a suitable leaving group, as defmed), each of $R_1$ and $R_2$ can also be hydrogen.

For a more detailed survey of the effect of leaving groups reference may be made to a textbook of organic chemistry, on the basis of which the ordinary skilled person can select a suitable leaving group of choice. See, for example, "Advanced Organic Chemistry" by J. March, 4th. ed., John Wiley & Sons (e.g. pp. 205, 1005 and 1008), herein incorporated by reference. Preferred leaving groups for the purpose of the present invention are chlorine and bromine.

More specifically, the group D mentioned in the formula I can be an oligomeric, e.g. divalent, trivalent or tetravalent, linear or branched, radical chosen from a $C_{1-18}$ alkyl, $C_{2-18}$ alkenyl, $C_{2-18}$ alkynyl, $C_{3-18}$ cycloalkyl, $C_{3-18}$ polycycloalkyl, $C_{6-18}$ aryl $C_{6-30}$ polyaryl, $C_{7-30}$ aralkyl, $C_{7-30}$ alkaryl, which radical may optionally contain one or more of oxygen, nitrogen, silicon, phosphorus, sulfur, sulphone, sulfoxy, boron and magnesium, and which radical may also be optionally substituted at one or more of the atoms in the radical with a substituent selected from oxygen, nitrogen, silicon, $SiO_2$, sulfoxy, boron, phosphorus, amido, imino, azo, diazo, hydrazo, azoxy, alkoxy, hydroxy, iodine, fluorine, bromine, chlorine, carbonyl, carboxy, ester, carboxylate, S—S, $SO_2$, $SO_3$, sulphonamido, $SiO_3$, nitro, imido, thiocarbamyl, cyano and epoxy groups. A preferred meaning of D is xylylene, and in particular m-xylylene.

Suitable succinimido compounds for use in the present invention include:

1,3-bis(chlorosuccinimidomethyl)benzene (BCSI-MX), 1,3-bis(bromosuccnimidomethyl)benzene (BBSI-MX), 1,3-bis(dibromosuccinimidomethyl)benzene (BDBSI-MX), 1,3-bis(bromosuccinimido)benzene (BBSI-B), bis(4-[bromosuccinimido]phenyl)methane (BBSI-MDA), 1,6-bis(bromosuccinimido)-2,2,4-trimethylhexane (BBSI-TMDA), 1,3-bis(mercaptosuccinimidomethyl)benzene (BTHS-MX), 1,3-bis(mesylsuccinimidomethyl)benzene (BMESS-MX), 1,3-bis(2-mercaptobenzothiazolylsuccinimidomethyl)benzene (BMBTS-MX), 1,3-bis(2-mercaptobenzothiazolylsucciniinido)benzene (BMBTS-B), bis(4-[2-mercaptobenzothiazolylsuccinimido]phenyl)methane (BMBTS-MDA), 1,6-bis(2-mercaptobenzothiazolylsuccinimido)-2,2,4-trimethylhexane (BMBTS-TMDA), 1,3-bis(dibenzyldithiocarbamoylsuccinimidomethyl)benzene (BBDTCS-MX), 1,3-bis(dibenzyldithiocarbamoylsuccinimido)benzene (BBDTCS-B), bis(4-[dibenzyldithiocarbamoylsuccinimido]phenyl)methane (BBDTCS-MDA), 1-dibenzyldithiocarbamoylsuccininido-3-bromosuccinimidobenzene (BDTCBS-B), 1,3-bis(acetylsuccinimidomethyl)benzene (BAS-MX), 1,3-bis(benzyloxydithiocarboxysuccinimidomethyl)benzene (BBXS-MX), 1,3-bis(benzyloxydithiocarboxysuccinimido)benzene (BBXS-B), 1,3-bis(3,4-dibromo-3-methylsuccinimidomethyl)benzene (BDBMS-MX), 1,3-bis(3-bromo-3- and 4-methylsuccinimidomethyl)benzene (BBMS-MX), 1,3-bis[3,6-oxa-cyclohex-4-ene-1,2-dicarboximido]methyl)benzene (BFS-MX), 1,3-bis(3,6-oxa-cyclohex-4-ene-1,2-dicarboximido)benzene (BFS-MX), 1,3-bis([3-ethoxydithiocarboxy]succinimidomethyl)benzene (BEXS-MX), and bis([bromomethylsuccinimido]phenyl)methane (BMBS-MDA).

Of these, the following compounds are particularly preferred: BCSI-MX, BBSI-MX, BDBSI-MX, BMBTS-MX, BBDTCS-MX, BBDTCS-B, BDTCBS-B, and BBMS-MX.

The substituted succinimide compounds of formula I may be prepared in a manner known per se, for example by reacting a substituted succinic acid and a diamino compound, e.g. m-xylylenediamine. The latter compound is known in the art, see e.g. Chemical Abstracts 107: 134698v (1986) and U.S. Pat. No. 4,482,741. Alternatively, the compounds of formula I may be prepared starting from the corresponding maleimido compounds, for example by introducing the desired substituent(s) through an addition reaction.

The bis-3-halogen succinimides of the present invention can be suitably made by feeding HX, wherein X is a halogen atom, through a solution of the corresponding bismaleimide in dichloromethane. Thus, a convenient way to make bis-3-chlorosuccinimido-m-xylylene, is to feed hydrogen chloride through a solution of m-xylylene bismaleimide in dichloromethane. A more preferred route is to add hydrogen chloride to (m-xylylene)bis maleamic acid in a suitable solvent, e.g. acetic acid, at elevated temperature till the addition is completed. The bis-3,4-dihalogensuccinimides of the present invention can be made, for example, by adding $X_2$, wherein X is a halogen atom, to a solution of the corresponding bismaleimide in dichloromethane at room temperature.

The amount of sulfur to be compounded with the rubber is, based on 100 parts of rubber, usually 0.1 to 25 parts by weight, and more preferably 0.2 to 8 parts by weight. The amount of sulfur donor to be compounded with the rubber is an amount sufficient to provide an equivalent amount of sulfur which is the same as if sulfur itself were used.

The amount of anti-reversion coagent to be compounded with the rubber is, based on 100 parts of rubber, 0.1 to 10 parts by weight, and more preferably 0.3 to 6 parts by weight. These ingredients may be employed as a pre-mix, or added simultaneously or separately, and they may be added together with other rubber compounding ingredients as well.

While not wishing to be bound by any particular theory, it is thought that the anti-reversion activity of the coagents according to the present invention is caused by the in situ formation of maleimides, probably by a 1,2-elimination reaction of the added succinimides under the thermal conditions of the rubber vulcanization and by the presence of amines which are formed in the sulfur vulcanization. It is also thought that under sulfur-vulcanization conditions, at optimum cure, a substantial portion of the coagent remains in the rubber composition in a form in which it is still capable of reacting with the sulfur-vulcanized rubber to form additional cross-links, which cross-links are bonded to the rubber by a carbon-carbon linkage. See also WO 92/07904, which is incorporated herein by reference. If desired, the elimination reaction may be accelerated by adding an catalytic amount of a suitable base to the rubber composition.

In most circumstances it is also desirable to have a vulcanization accelerator in the rubber compound. Conventional, known vulcanization accelerators may be employed. The preferred vulcanization accelerators include mercaptobenzothiazole, 2,2'-mercaptobenzo-thiazole disulfide, sulfenamide accelerators including N-cyclohexyl-2-benzothiazole sulfenamide, N-tertiary-butyl-2-benzothiazole sulfenamide, N,N'-dicyclohexyl-2-benzothiazole sulfenamide, and 2-(morpholinothio)benzothiazole; thiophosphoric acid derivative accelerators, thiurams, dithiocarbamates, diphenyl guanidine, diortho-tolyl guanidine, dithiocarbamylsulfenamides, xanthates, triazine accelerators and mixtures thereof.

When the vulcanization accelerator is employed, quantities of from 0.1 to 8 parts by weight, based on 100 parts by weight of rubber composition, are used. More preferably, the vulcanization accelerator comprises 0.3 to 4.0 parts by weight, based on 100 parts by weight of rubber.

Other conventional rubber additives may also be employed in their usual amounts. For example, reinforcing agents such as carbon black, silica, clay, whiting and other mineral fillers, as well as mixtures of fillers, may be included in the rubber composition. Other additives such as process oils, tackifiers, waxes, antioxidants, antiozonants, pigments, resins, plasticizers, process aids, factice, compounding agents and activators such as stearic acid and zinc oxide may be included in conventional, known amounts. For a more complete listing of rubber additives which may be used in combination with the present invention see, Hofmann, *Rubber Technology Handbook*, Chapter 4, Rubber Chemicals and Additives, pp. 217–353, Hanser Publishers, Munich 1989.

Further, scorch retarders such as phthalic anhydride, pyromellitic anhydride, benzene hexacarboxylic trianhydride, 4-methylphthalic anhydride, trimellitic anhydride, 4-chlorophthalic anhydride, N-cyclohexyl-thiophthalimide, salicylic acid, benzoic acid, maleic anhydride, citraconic anhydride, itaconic anhydride and N-nitrosodiphenylamine may also be included in the rubber composition in conventional, known amounts. Finally, in specific applications it may also be desirable to include steel-cord adhesion promoters such as cobalt salts and dithiosulfates in conventional, known quantities.

The present invention also relates to a vulcanization process which comprises the step of vulcanizing at least one natural or synthetic rubber in the presence of 0.1 to 25 parts by weight of sulfur or a sulfur donor per 100 parts by weight of rubber, characterized in that said process is carried out in the presence of an effective amount of a coagent of formula I, as defined above.

The process is carried out at a temperature of 110°–220° C. over a period of up to 24 hours. More preferably, the process is carried out at a temperature of 120°–190° C. over a period of up to 8 hours in the presence of 0.1 to 10 parts by weight of anti-reversion coagent. Even more preferable is the use of 0.3–6.0 parts by weight of anti-reversion coagent. All of the additives mentioned above with respect to the rubber composition may also be present during the vulcanization process of the invention.

In a more preferred embodiment of the vulcanization process, the vulcanization is carried out at a temperature of 120°–190° C. over a period of up to 8 hours and in the presence of 0.1 to 8.0 parts by weight, based on 100 parts by weight of rubber, of at least one vulcanization accelerator.

Finally, the present invention also includes articles of manufacture, such as tires and belts, which comprise sulfur-vulcanized rubber which is vulcanized in the presence of the anti-reversion coagents of the present invention.

The invention is further illustrated by the following examples which are not to be construed as limiting the invention in any way. The scope of the invention is to be determined from the claims appended hereto.

Experimental

Methods used in the Examples: compounding vulcanization and characterization of compounds In the following examples, rubber compounding, vulcanization and testing was carried out according to standard methods except as stated otherwise.

Base compounds were mixed in a Farrel Bridge BR 1.6 liter Banbury type internal mixer (preheating at 50° C., rotor speed 77 rpm, mixing time 6 min with full cooling). Vulcanization ingredients and coagents were added to the compounds on a Schwabenthan Polymix 150L two-roll mill (friction 1:1.22, temperature 70° C., 3 min). Sheets and test specimens were vulcanized by compression molding in a Fontyne TP400 press.

Cure characteristics were determined using a MDR 2000E (arc 0.5°): delta torque or extent of crosslinking (R∞) is the maximum torque (MH, also denoted as initial torque maximum, $T_i$) minus the minimum torque (ML). Scorch safety ($t_s2$) is the time to 2% of delta torque above minimum torque (ML], optimum cure time ($t_{90}$) is the time to 90% of delta torque above minimum, reversion time ($t_r2$) is the time to 2% of delta torque below maximum torque. Final torque ($T_f$) is the torque measured after the overcure time.

Tensile measurements were carried out using a Zwick 1445 tensile tester (ISO-2 dumbbells, tensile properties according to 412-87, tear strength according to ASTM D 624-86). Hardness was determined according to DIN 53505, and ISO 48 (IRHD). Heat build-up (HBU) and compression set after dynamic loading were determined using a Goodrich Flexometer (load 11 Kg, stroke 0.445 cm, frequency 30 Hz, start temperature 100° C., running time 25 min; ASTM D 623-78), unless stated otherwise.

Examples 1–3: BCSI-MX, BBSI-MX, BDBSI-MX, and Comparative Example A

Example 1: 1,3-bis(chlorosuccinimidomethyl)benzene (BCSI-MX)

Bis-3-chlorosuccinimido-m-xylene was prepared by adding hydrogen chloride to a suspension of 5 g (m-xylylene)bis maleamic acid in 50 ml acetic acid at 35° C. till the addition was completed. The acetic acid was distilled off at 50° C. under reduced pressure and the crude 1,3-bis (chlorosuccinimidomethyl)benzene was dried. The yield was 100%.

Example 2: 1,3-bis(bromosuccinimidomethyl)benzene (BBSI-MX)

Bis-3-bromosuccinimido-m-xylylene was prepared in a 91% yield by feeding hydrogen bromide gas through a solution of m-xylylene bismaleimide in dichloromethane at room temperature.

Example 3: 1,3-bis(dibromosuccinimidomethyl)benzene (BDBSI-MX)

Bis-3,4-dibromosuccinimido-m-xylylene was prepared in 45% yield by addition of bromine to a solution of m-xylylene bismaleimide in dichloromethane at room temperature.

These three materials were tested in the sulfur vulcanization process of the present invention using the formulations shown in Table 1.

TABLE 1

| Ingredients | A | 1 | 2 | 3 |
| --- | --- | --- | --- | --- |
| Natural Rubber SMR CV | 100.0 | 100.0 | 100.0 | 100.0 |
| Carbon Black N-330 | 50.0 | 50.0 | 50.0 | 50.0 |
| Stearic Acid | 2.0 | 2.0 | 2.0 | 2.0 |
| Zinc Oxide | 5.0 | 5.0 | 5.0 | 5.0 |
| Arom. Oil Ingralen ® 150 | 3.0 | 3.0 | 3.0 | 3.0 |
| Perkacit ® CBS c | 0.6 | 0.6 | 0.6 | 0.6 |
| Sulphur | 2.3 | 2.3 | 2.3 | 2.3 |
| BCSI-MX | 0.0 | 1.0 | 0.0 | 0.0 |
| BBSI-MX | 0.0 | 0.0 | 1.0 | 0.0 |
| BDBSI-MX | 0.0 | 0.0 | 0.0 | 1.0 |

These rubber compositions were vulcanized and subjected to aging at both 150° C. and 170° C. and the reversion (%) was calculated from the following formula:

$$\text{Reversion}(\%) = \frac{\text{Torque}_{(maximum)} - \text{Torque}_{(at\ time\ t)}}{\text{Torque}_{(maximum)}} \times 100\%$$

The results of these tests are given in Table 2.

TABLE 2

| Tested Compound | Reversion (%) at 150° C./60' | Reversion (%) at 170° C./30' | $t_s 2^*$ min. | $t_{90}$ min. |
|---|---|---|---|---|
| Control | 13 | 31 | 1.0 | 3.04 |
| BCSI-MX | 3 | 10 | 1.23 | 3.95 |
| BBSI-MX | 0 | 9 | 1.28 | 4.32 |
| BDBSI-MX | 0 | 8 | 1.30 | 4.73 |

From these examples it can be seen that the compounds used in the process of the present invention significantly reduce the reversion in the sulfur-vulcanized rubber compositions. Further, the compounds used in the process of the present invention provide the additional advantage that they increase the scorch time ($t_s 2$) when compared to the control example, while having a longer cure time.

In addition, experimental observation of the curing curves of these rubber compositions showed that the cross-link density of the rubber compositions of the present invention remained quite constant from $t_{90}$ through aging, whereas with some other anti-reversion agents the phenomena of marching (a gradual increase in cross-link density with aging) or dip (a significant decrease in cross-link density immediately following $t_{90}$ often followed by marching to compensate therefor) were observed.

Examples 4–6: BCSI-MX, BBSI-MX, BDBSI-MX, and Comparative Example B

The same three materials as employed in Examples 1–3 were tested in the sulfur vulcanization process of the present invention using the formulations shown in Table 3.

TABLE 3

| Ingredients | B | 4 | 5 | 6 |
|---|---|---|---|---|
| Natural Rubber SMR CV | 100.0 | 100.0 | 100.0 | 100.0 |
| Carbon Black N-330 | 50.0 | 50.0 | 50.0 | 50.0 |
| Stearic Acid | 2.0 | 2.0 | 2.0 | 2.0 |
| Zinc Oxide | 5.0 | 5.0 | 5.0 | 5.0 |
| Arom. Oil Ingralen ® 150 | 3.0 | 3.0 | 3.0 | 3.0 |
| Perkacit ® CBS c | 0.8 | 0.8 | 0.8 | 0.8 |
| Sulphur | 3.07 | 3.07 | 3.07 | 3.07 |
| BCSI-MX | 0.0 | 1.33 | 0.0 | 0.0 |
| BBSI-MX | 0.0 | 0.0 | 1.33 | 0.0 |
| BDBSI-MX | 0.0 | 0.0 | 0.0 | 1.33 |

These rubber compositions were vulcanized at both 150° C. and 170° C. and the cure data were measured according to the procedures given above. The results are given in Tables 4 and 5.

TABLE 4

| Properties at 150° C. | B | 4 | 5 | 6 |
|---|---|---|---|---|
| Delta Torque (Nm) | 1.97 | 2.20 | 2.11 | 2.04 |
| Scorch Time $t_s 2$ (min.) | 3.6 | 5.4 | 4.9 | 4.9 |
| Cure time $t_{90}$ (min.) | 11.4 | 23.2 | 17.4 | 19.8 |

TABLE 5

| Properties at 170° C. | B | 4 | 5 | 6 |
|---|---|---|---|---|
| Delta Torque (Nm) | 1.76 | 1.95 | 1.92 | 1.86 |
| Scorch Time $t_s 2$ (min.) | 1.0 | 1.2 | 1.3 | 1.3 |
| Cure time $t_{90}$ (min.) | 3.0 | 4.0 | 4.3 | 4.7 |

From these results it is apparent that the rubber compositions obtained by the process of the present invention exhibit improved scorch time, cross-link density (as indicated by delta torque) while having a longer cure time.

The mechanical properties of these rubber compositions were measured according to the methods given above and the results are given in Table 6.

TABLE 6

| Properties | B | 4 | 5 | 6 |
|---|---|---|---|---|
| Hardness (IHRD) | 72 | 76 | 77 | 76 |
|  | (68) | (77) | (75) | (75) |
| Tensile Strength (MPa) | 25.9 | 24.1 | 24 | 24.5 |
|  | (21.8) | (22.9) | (23.1) | (22.1) |
| Elongation (%) | 430 | 390 | 390 | 385 |
|  | (410) | (355) | (370) | (350) |
| 100% Modulus (MPa) | 3.9 | 4.4 | 4.4 | 4.3 |
|  | (3.0) | (4.6) | (4.2) | (4.2) |
| 300% Modulus (MPa) | 18.0 | 18.3 | 18.2 | 18.8 |
|  | (14.4) | (19.2) | (18.2) | (18.6) |

Values in parenthesis are those for the vulcanizates cured at 170° C. for 60 minutes. The remaining values are for the vulcanizates cured at 150° C. for 60 minutes.

The heat buildup (°C.) was measured using the method given above and the results are given in Table 7.

TABLE 7

| Example | 150° C., $t_{90}$*2 | 150° C., 60 min. | 170° C., 30 min. |
|---|---|---|---|
| B | 16 | 23 | 32 |
| 4 | 17 | 18 | 20 |
| 5 | 17 | 18 | 22 |
| 6 | 17 | 18 | 22 |

These results demonstrate that the heat buildup can be reduced in some rubber compositions using the vulcanization process of the present invention.

Examples 7–9: BBSI-B, BBSI-MDA, BBSI-TMDA

General procedure for the bromosuccinimides synthesis: hydrogen bromide was bubbled through a solution of 50 mmole maleimide in 100 ml dichloromethane. After 5 hours the reaction was stopped and the solvent was removed under reduced pressure. The crude product was tested without further purification.

Example 7: 1,3-Bis(bromosuccinimido)benzene (BBSI-B)
Yield is 98% of a yellow solid.

Example 8: Bis(4-[bromosuccinimido]phenyl)methane (BBSI-MDA) Yield is 92% of a yellow solid.

Example 9: 1,6-Bis(bromosuccinimido)-2,2,4-trimethylhexane (BBSI-TMDA)
Yield is 95% of a brown viscous substance.

Examples 10–13: BBDTCS-MX, BBDTCS-B, BBDTCS-MDA, BDTCBS-B

Example 10: 1,3-Bis(dibenzyldithiocarbamoylsuccinimidomethyl)benzene (BBDTCS-MX)

Ethanol (50 ml) was added to a mixture of dibenzyldithiocarbamicacid sodium salt solution (17.9%—50 g, 30 mmole) and 1,3-bis(bromosuccinimidomethyl)benzene. The temperature was kept below 25° C. with an ice-bath. Dimethylformamide (150 ml) was added till a clear solution arised. The mixture was stirred for 4 hours and a viscous substance was formed. The solvents were evaporated and the crude product was taken in water (400 ml) and suspended. The crystals were collected and washed with water and ethanol. The yield was 12 g (92%) of a brown/yellow product, m.p. 80°–90° C.

Example 11: 1,3-Bis(dibenzyldithiocarbamoylsuccinimido)benzene (BBDTCS-B)

1,3-bis(bromosuccinimido)benzene (5 g, 11.6 mmole) was dissolved in a mixture of dichloromethane (200 ml) and ethanol (200 ml). Dibenzyldithiocarbamic acid, sodium salt solution (17.9%—28.2 g, 23.2 mmole) was added dropwise. The mixture was stirred at room temperature for 20 minutes. The dichloromethane was evaporated under reduced pressure and the product crystallized. The crude product was collected and washed with ethanol, water, ethanol and ether. The yield was 9.0 g (95%) of a yellow solid, m.p. 113°–145° C.

Example 12: Bis(4-[dibenzyldithiocarbamoylsuccinimido]phenyl)methane (BBDTCS-MDA)

Same procedure as BBDTCS-MDA. The yield was 96%, m.p. 112°–145° C.

Example 13: 1-Dibenzyldithiocarbamoylsuccinimido-3-bromosuccinimidobenzene (BDTCBS-B)

To a suspension of 1,3-bis(bromosuccinimido)benzene (10 g, 23.3 mmole) in methanol (100 ml), a sodium salt solution of dibenzyldithiocarbamic acid (17,9%—84 g, 50 mmole) was added dropwise at 10° C. The mixture was stirred for 2 hours. The crystals were collected and washed with water and ether. The yield was 100% of a white solid. M.p. 82°–100° C.

Examples 14–17: BMBTS-MX, BMBTS-B, BMBTS-MDA, BMBTS-TMDA

Example 14: 1,3-Bis(2-mercaptobenzothiazolylsuccinimidomethyl)benzene (BMBTS-MX)

BMI-MX (5.0 g, 17 mmol), 2-mercaptobenzothiazole (6.2 g, 36 mmol) and DABCO (0.15 g) were dissolved in 1,4-dioxane (70 ml) and stirred for 24 hours at room temperature. A light brown product was crystallized from the mixture. The crude product was collected, washed with ether and dried. No further purification was done. The yield was 5.7 gram (53%), m.p. 183°–185° C.

Example 15: 1,3-Bis(2-mercaptobenzothiazolylsuccinimido)benzene (BMBTS-B)

1,3-bis(maleimido)benzene (5.0 g, 18.7 mmol), 2-mercaptobenzothiazole (6.5 g, 39 mmol) and DABCO (0.15 g) were dissolved in 1,4-dioxane (100 ml) and stirred for 4 days at room temperature. The 1,4-dioxane was evaporated, leaving a dark brown solid. No further purification was done. The yield of the crude product was 11 g (98%).

Example 16: Bis(4-[2-mercaptobenzothiazolylsuccinimido]phenyl)methane (BMBTS-MDA)

The same procedure as BMBTS-B. The crude product was a dark brown solid. The yield was 10 g (100%).

Example 17: 1,6-Bis(2-mercaptobenzothiazolylsuccinimido)-2,2,4-trimethylhexane (BMBTS-TMDA)

The same procedure as BMBTS-B. The crude product was a brown solid. The yield was 83%, m.p. 70°–75° C., 125° C. (dec.).

Examples 18–19 (BMESS-MX, BTHS-MX)

Example 18: 1,3-bis(mesylsuccinimidomethyl)benzene (BMESS-MX)

6 g (53 mmole) Methanesulfonylchloride was added dropwise to a mixture of 53 mmole 1,3-bis(hydroxysuccinimidomethyl)benzene in 25 ml pyridine at 0° C. After 1.5 hours the mixture was added to 400 ml cold water and the product crystallized. The crystals were collected and washed with water and ether and dried. The yield was 60%.

Example 19: 1,3-Bis(mercaptosuccinimidomethyl)benzene (BTHS-MX)

Preparation mercaptosuccinic anhydride solution: a mixture of 25 g (0.17 mole) mercaptosuccinic acid, 17 g (0.17 mole) acetic anhydride and 0.025 g Mg(OAc).4H$_2$O was stirred at 40° C. for 1 hour. 11.3 g (0.083 mole) metaxylene diamine was added dropwise to 100 ml acetic acid. The mixture was heated till 80° C. and the mercaptosuccinic anhydride solution was added dropwise. The water/acetic acid azeotrope was distilled off at 130° C. leaving a viscous product. The crude product was taken in dichloromethane. The insoluble solids were filtered. The solvent of the residu was evaporated, leaving a white product. After standing the product became sticky.

Examples 20–24: BAS-MX, BDBMS-MX, BBMS-MX, BBXS-MX, BBXS-B

Example 20: 1,3-Bis(acetylsuccinimidomethyl)benzene (BAS-MX)

A mixture of 10 g 1,3-bis(hydroxysuccinimidomethyl)benzene, 20 mg magnesium acetate and 50 ml acetic anhydride was heated at 100° C. for 1 hour. The acetic anhydride and acetic acid were evaporated under reduced pressure, leaving 9 g (72%) of a light brown crystalline product.

Example 21: 1,3-Bis(3,4-dibromo-3-methylsuccinimidomethyl)benzene (BDBMS-MX)

5 g bromine and 5 g 1,3-bis(citraconimiomethyl)benzene in 100 ml dichloromethane were stirred for 48 h at room temperature. The dichloromethane was evaporated under reduced pressure leaving 7 g (73%) of a yellow crystalline product.

Example 22: 1,3-Bis(3-bromo 3- and 4-methylsuccinimidomethyl)benzene (BBMS-MX)

Hydrogen bromide was bubbled through a solution of 7.5 g 1,3-bis(citraconimidomethyl)-benzene in 100 ml dichloromethane for 2 h at room temperature. The reaction vessel was closed and the reaction mixture was stirred for 16 h. Excess HBr was removed with a nitrogen stream. The dichloromethane was evaporated under reduced pressure leaving 9.2 g (83%) of a yellow crystalline product. A mixture of 3-bromo-3-methyl and 3-bromo-4-methyl succinimidomethyl benzene compounds was obtained, in which the former compound was predominant.

Example 23: 1,3-Bis(benzyloxydithiocarboxysuccinimidomethyl)benzene (BBXS-MX)

A solution of 4.9 g (22 mmole) potassium benzylxanthate in 100 ml ethanol was added dropwise to a stirred solution of 5 g (11 mmole) 1,3-bis(bromosuccinimidomethyl)benzene in 100 ml dichloromethane. The reaction mixture was stirred for 1 h at room temperature. The solvent was evaporated under reduced pressure. The residue was taken in water and the insoluble product was collected and dried. The yield was 6.2 g (85%) of a brown crystalline product.

Example 24: 1,3-Bis(benzyloxydithiocarboxysuccinimido)benzene (BBXS-B)
Preparation: same as BBXS-MX.

Examples 25–28: BFS-MX, BFS-B, BEXS-MX, BMBS-MDA

Example 25: 1,3-Bis([3,6-oxa-cyclohex-4-ene-1,2-dicarboximido]methyl)benzene(BFS-MX)

10 g 1,3-bis(maleimidomethylbenzene was dissolved in a mixture of 20 ml furan and 20 ml dichloromethane and heated till 30° C. for 3 hours. The solvent was evaporated under reduced pressure leaving 14.5 g (100%) of a brown crystalline product.

Example 26: 1,3-Bis(3,6-oxa-cyclohex-4-ene-1,2-dicarboximido)benzene (BFS-B)

5 g 1,3-bis(maleimido)benzene was dissolved in a mixture of 25 ml furan and 15 ml dioxane and heated till 30° C. After about 2.5 hours, a white product crystallized. The crystals were collected, washed with methanol and dried. The yield was 6.2 g (82%) of a white crystalline product. m.p. 140° C. (dec.).

Example 27: 1,3-Bis([3-ethoxydithiocarboxy]succinimidomethyl)benzene (BEXS-MX)

Preparation ethylxanthate solution: 1.84 g KOH was dissolved in 100 ml absolute ethanol. 2.6 g carbondisulfide was then added and the mixture was stirred for 15 minutes. The ethyl-xanthate solution was added dropwise to a stirred solution of 7.5 g 1,3-bis(bromosuccinimidomethyl)benzene in 100 ml dichloromethane at room temperature. The reaction mixture was stirred for 30 minutes. The solvent was evaporated under reduced pressure. The residue was dissolved in dichloromethane and extracted twice with water. The organic layer was separated, dried with $MgSO_4$ and evaporated under reduced pressure, leaving 5.2 g (60%) of a brown crystalline product.

Example 28: Bis([bromomethylsuccinimido]phenyl)methane (BMBS-MDA)

Hydrogen bromide was bubbled through a solution of 5 g bis(4-itaconimidophenyl)methane i 100 ml dichloromethane. Excess hydrogen bromide was removed with a nitrogen flow. The solvent was evaporated under reduced pressure leaving 5.2 g of a yellow crystalline product.

Application tests

The compounds prepared according Examples 7–28 were tested in the sulfur vulcanization process of the present invention using formulations identical tho those shown in Table 1, except that BCSI-MX, BBSI-MX, and BDBSI-MX were replaced by the respective succinimide compounds exemplified in these Examples. These rubber compositions were vulcanized and subjectd to aging at both 150° C. and 170° C. The cure data were measured and the reversion was calculated according to the procedures given above. In some instances the heat buildup was measured using the method described before above. The results are given in Table 8.

TABLE 8

| Ex. No. | Tested Compound (at 1 phr level) | Reversion (%) 150° C./60' | Reversion (%) 170°/30' | 150° C. $ts_2$ min | 150° C. $t_{90}$ min | 170° C. $ts_2$ min | 170° C. $t_{90}$ min | HBU 150° C./60' |
|---|---|---|---|---|---|---|---|---|
| A | Control | 13 | 31 | 4.08 | 11.22 | 1.06 | 3.04 | 41 |
| 1 | BCSI-MX | 3 | 10 | | | 1.23 | 3.95 | |
| 2 | BBSI-MX | 0 | 9 | 4.89 | 17.36 | 1.28 | 4.32 | |
| 3 | BDBSI-MX | 0 | 8 | 4.88 | 19.79 | 1.30 | 4.73 | |
| 7 | BBSI-B | 0 | 14 | 5.85 | 17.65 | 1.27 | 4.16 | 30 |
| 8 | BBSI-MDA | 4 | 17 | 5.53 | 15.96 | 1.17 | 3.92 | 30 |
| 9 | BBSI-TMDA | | 10 | 5.13 | 17.35 | 1.18 | 4.54 | |
| 10 | BBDTCS-MX | 6 | 19 | 4.59 | 9.20 | 1.00 | 2.51 | 32 |
| 10 | BBDTCS-MX* | 0 | 10 | 4.24 | 8.50 | 1.02 | 2.44 | |
| 11 | BBDTCS-B | | 9 | 4.37 | 8.35 | 0.96 | 2.31 | |
| 12 | BBDTCS-MDA | | 16 | 4.70 | 10.01 | 0.99 | 2.68 | |
| 13 | BDTCBS-B | | 9 | 4.81 | 10.81 | 1.16 | 2.87 | |
| 14 | BMBTS-MX | 6 | 20 | 4.28 | 10.57 | 0.99 | 2.77 | 33 |
| 14 | BMBTS-MX* | 0 | 4 | 3.55 | 10.27 | 1.05 | 2.88 | |
| 15 | BMBTS-B | 11 | 26 | 2.55 | 7.16 | 0.86 | 2.14 | 34 |
| 16 | BMBTS-MDA | 10 | 26 | 2.91 | 7.69 | 0.95 | 2.35 | 30 |
| 17 | BMBTS-TMDA | | 18 | 3.97 | 9.80 | 1.12 | 2.81 | |
| 18 | BMESS-MX | 5 | 19 | 5.50 | 15.34 | 1.11 | 3.68 | |
| 19 | BTHS-MX | | 23 | 1.94 | 8.47 | 0.72 | 2.49 | |
| 20 | BAS-MX | 3 | 16 | 4.28 | 13.89 | 1.14 | 3.55 | |
| 21 | BDBMS-MX | 0 | 10 | 5.00 | 16.63 | 1.15 | 3.89 | |
| 22 | BBMS-MX | 0 | 4 | 4.75 | 15.67 | 1.10 | 3.63 | |
| 23 | BBXS-MX | 8 | 23 | 1.78 | 9.07 | 0.78 | 2.59 | |
| 24 | BBXS-B | | 26 | | | 0.79 | 2.72 | |
| 25 | BFS-MX | 8 | 19 | 4.96 | 13.02 | 1.01 | 3.20 | |
| 26 | BFS-B | 8 | 20 | 4.85 | 13.16 | 1.05 | 3.27 | |
| 27 | BEXS-MX | 6 | 18 | 2.81 | 9.99 | 0.89 | 2.76 | |
| 28 | BMBS-MDA | 2 | 10 | 4.51 | 13.91 | 1.14 | 3.65 | |

*At 2 phr level

From these results it can be seen that the compounds used in the process of the present invention significantly reduce the reversion in the sulfur-vulcanized rubber compositions. Further, most of the compounds used in the process of the present invention show a similar or improved scorch time ($t_s2$) when compared to the control example. Where the heat buildup was determined in the rubber compositions using the vulcanization process of the present invention, the results show that the heat buildup was reduced.

The foregoing examples were presented for the purpose of illustration and description only and are not to be construed as limiting the invention in any way. The scope of the invention is to be determined by the claims appended hereto.

We claim:

1. A sulfur-vulcanizable rubber composition which comprises:

(A) 100 parts by weight of at least one natural or synthetic rubber;
   (B) 0.1 to 25 parts by weight of sulfur and/or a sufficient amount of a sulfur donor to provide the equivalent of 0.1 to 25 parts by weight of sulfur; and
   (C) 0.1 to 10 parts by weight of a coagent of the formula I:

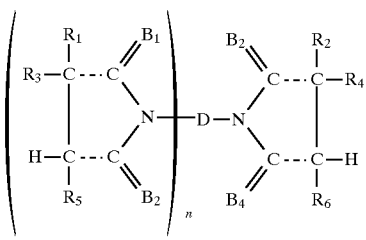

wherein $R_1$ and $R_2$ represent each independently hydrogen or a leaving group suitable to form an endocyclic or exocyclic double bond; $R_3$ and $R_4$ are independently selected from hydrogen, OH, $CH_2OH$, $CH_2Cl$, $CH_2Br$, $CH_2NH_2$, $CH_2CN$, $CH_2I$, $CHF_2$, $CHClBr$, $CHI_2$, $CH_2R_1$, $CH_2R$, $CH_2OR$, $SO_2R$, $CHCl_2$, $CCl_3$, $CHBr_2$, $CBr_3$, $CH_2F$ and $CF_3$, wherein R is hydrogen, $C_{1-10}$ alkyl, $C_{6-18}$ aryl, $C_{7-20}$ alkaryl or $C_{7-20}$ aralkyl, the aryl groups being optionally substituted; provided that $R_1$ and $R_3$, and $R_2$ and $R_4$, are not both hydrogen; $R_5$ and $R_6$ are independently selected from the same substituents as for $R_3$ and may also be halogen; $B_1$, $B_2$, $B_3$, and $B_4$ are independently selected from oxygen and sulfur; n is an integer from 1 to 10; and D is an (n+1) polyvalent radical.

2. The rubber composition of claim 1 wherein said rubber composition further comprises 0.1 to 8.0 parts by weight of a vulcanization accelerator.

3. A rubber composition according to claim 1 wherein said coagent comprises a compound selected from 1,3-bis(chlorosuccinimidomethyl)benzene,
   1,3-bis(bromosuccinimidomethyl)benzene,
   1,3-bis(dibromosuccinimidomethyl)benzene,
   1,3-bis(2-mercaptobenzothiazolylsuccinimidomethyl)benzene,
   1,3-bis(dibenzyldithiocarbamoylsuccinimidomethyl)benzene,
   1,3-bis(dibenzyldithiocarbamoylsuccinimido)benzene,
   1-dibenzyldithiocarbamoylsuccinimido-3-bromosuccinimidobenzene,
   1,3-bis(3-bromo-3-methylsuccinimidomethyl)benzene, and
   1,3-bis(3-bromo-4-methylsuccinimidomethyl)benzene.

4. A process for the vulcanization, at a temperature of from 110° to 220° C. for up to 24 hours, of a vulcanizable composition comprising at least one natural or synthetic rubber in the presence of 0.1 to 25 parts by weight of sulfur or a sufficient amount of a sulfur donor to provide the equivalent of 0.1 to 25 parts by weight of sulfur, wherein said process is carried out in the presence of 0.1 to 10 parts by weight of a coagent of the formula I:

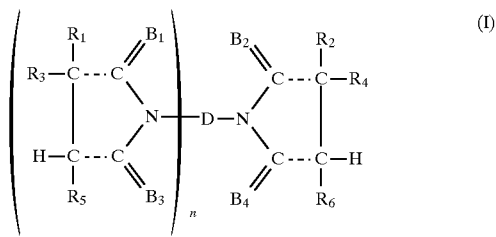

wherein $R_1$ and $R_2$ represent each independently hydrogen or a leaving group suitable to form an endocyclic or exocyclic double bond; $R_3$ and $R_4$ are independently selected from hydrogen, OH, $CH_2OH$, $CH_2Cl$, $CH_2Br$, $CH_2NH_2$, $CH_2CN$, $CH_2I$, $CHF_2$, $CHClBr$, $CHI_2$, $CH_2R_1$, $CH_2R$, $CH_2OR$, $SO_2R$, $CHCl_2$, $CCl_3$, $CHBr_2$, $CBr_3$, $CH_2F$ and $CF_3$, wherein R is hydrogen, $C_{1-10}$ alkyl, $C_{6-18}$ aryl, $C_{7-20}$ alkaryl or $C_{7-20}$ aralkyl, the aryl groups being optionally substituted; provided that $R_1$ and $R_3$, and $R_2$ and $R_4$, are not both hydrogen; $R_5$ and $R_6$ are independently selected from the same substituents as for $R_3$ and may also be halogen; $B_1$, $B_2$, $B_3$, and $B_4$ are independently selected from oxygen and sulfur; n is an integer from 1 to 10; and D is an (n+1) polyvalent radical; to compensate for from 10 to 200 percent of the reversion of said rubber composition.

5. The vulcanization process of claim 4, wherein said rubber is vulcanized in the further presence of 0.1 to 8.0 parts by weight of a vulcanization accelerator.

6. A vulcanization process according to claim 4 wherein said coagent comprises a compound selected from the group consisting of 1,3-bis(chlorosuccinimidomethyl)benzene,
   1,3-bis(bromosuccinimidomethyl)benzene,
   1,3-bis(dibromosuccinimidomethyl)benzene,
   1,3-bis(2-mercaptobenzothiazolylsuccinimidomethyl)benzene,
   1,3-bis(dibenzyldithiocarbamoylsuccinimidomethyl)benzene,
   1,3-bis(dibenzyldithiocarbamoylsuccinimido)benzene,
   1-dibenzyldithiocarbamoylsuccinimido-3-bromosuccinimidobenzene,
   1,3-bis(3-bromo-3-methylsuccinimidomethyl)benzene, and
   1,3-bis(3-bromo4-methylsuccinimidomethyl)benzene.

7. A method for improving the physical properties of rubber which comprises vulcanizing said rubber in the presence of a coagent of the formula I:

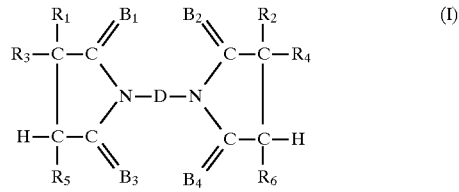

wherein $R_1$ and $R_2$ represent each independently hydrogen or a leaving group suitable to form an endocyclic or exocyclic double bond; $R_3$ and $R_4$ are independently selected from hydrogen, OH, $CH_2OH$, $CH_2Cl$ $CH_2Br$, $CH_2HN_2$, $CH_2CN$, $CH_2I$, $CHF_2$, $CHClBr$, $CHI_2$, $CH_2R_1$, $CH_2R$, $CH_2OR$, $SO_2R$, $CHCl_2$, $CCl_3$, $CHBr_2$, $CBr_3$, $CH_2F$ and $CF_3$, wherein R is hydrogen, $C_{1-10}$, alkyl, $C_{6-18}$ aryl, $C_{7-20}$ alkaryl or $C_{7-20}$ aralkyl, the aryl groups being optionally substituted; provided that $R_1$ and $R_3$, and $R_2$ and $R_4$, are not both hydrogen; $R_5$ and $R_6$ are independently selected from the same substituents as for $R_3$ and may also be halogen; $B_1$, $B_2$, $B_3$, and $B_4$ are independently selected from oxygen and sulfur; n is an integer from 1 to 10; and D is an (n+l) polyvalent radical; in an amount effective to compensate for from 10 to 200 percent of the reversion of said rubber composition.

8. The method of claim 7 wherein said coagent comprises a compound selected from the group consisting of 1,3-bis(chlorosuccinimidomethyl)benzene, 1,3-bis(bromosuccinimidomethyl)benzene, 1,3-bis(dibromosuccinimidomethyl)benzene, 1,3-bis(2-mercaptobenzothiazolylsuccinimidomethyl) benzene, 1,3-bis(dibenzyldithiocarbamoylsuccinimidomethyl) benzene, 1,3-bis(dibenzyldithiocarbamoylsuccinimido)benzene, 1-dibenzyldithiocarbamoylsuccinimido-3-bromosuccinimidobenzene, 1,3-bis(3-bromo-3-methylsuccinimidomethyl)benzene, and 1,3-bis(3-bromo-4-methylsuccinimidomethyl)benzene.

9. An article of manufacture comprising a rubber vulcanized by the process of claim 4.

10. A tire of belt comprising a rubber vulcanized by the process of claim 4.

* * * * *

UNITED STATES PATENT AND TRADEMARK OFFICE
CERTIFICATE OF CORRECTION

PATENT NO. : 5,844,049
DATED : December 1, 1998
INVENTOR(S) : DATTA, R., et al.

It is certified that error appears in the above-indentified patent and that said Letters Patent is hereby corrected as shown below:

In claim 7, column 16, general formula (I), should read

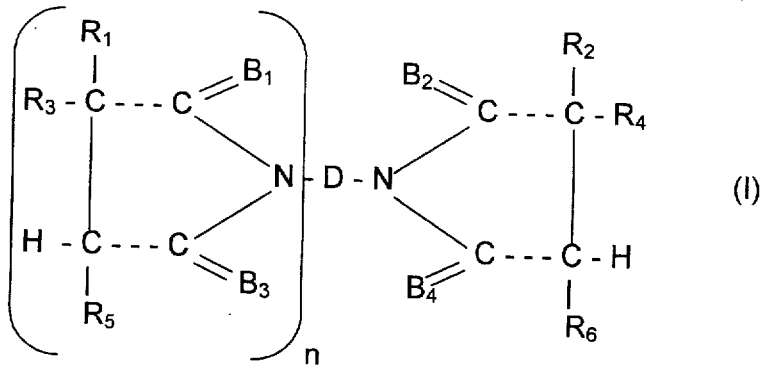

(I)

Signed and Sealed this

Fifth Day of December, 2000

Attest:

Q. TODD DICKINSON

Attesting Officer

Director of Patents and Trademarks